US011500801B2

(12) United States Patent
Lai et al.

(10) Patent No.: US 11,500,801 B2
(45) Date of Patent: Nov. 15, 2022

(54) COMPUTING APPARATUS UTILIZING PROGRAMMABLE LOGIC CIRCUIT TO IMPLEMENT DIRECT MEMORY ACCESS ENGINE AND AT LEAST ONE PHYSICAL ENGINE AND PROVIDING DATA TO BE PROCESSED TO AT LEAST ONE PHYSICAL ENGINE THROUGH DIRECT MEMORY ACCESS ENGINE

(71) Applicant: VIA Technologies Inc., New Taipei (TW)

(72) Inventors: Yi-Lin Lai, New Taipei (TW); Jiin Lai, New Taipei (TW); Chin-Yin Tsai, New Taipei (TW)

(73) Assignee: VIA Technologies Inc., New Taipei (TW)

( * ) Notice: Subject to any disclaimer, the term of this patent is extended or adjusted under 35 U.S.C. 154(b) by 38 days.

(21) Appl. No.: 17/189,176

(22) Filed: Mar. 1, 2021

(65) Prior Publication Data

US 2021/0303494 A1 Sep. 30, 2021

Related U.S. Application Data

(60) Provisional application No. 62/993,727, filed on Mar. 24, 2020.

(30) Foreign Application Priority Data

Jan. 26, 2021 (TW) .................................. 110102840

(51) Int. Cl.
*G06F 13/28* (2006.01)
*G06F 13/16* (2006.01)
(Continued)

(52) U.S. Cl.
CPC .......... *G06F 13/28* (2013.01); *G06F 13/1668* (2013.01); *H04L 67/1097* (2013.01); *H04L 67/34* (2013.01)

(58) Field of Classification Search
CPC .................................. G06F 21/00; G06F 21/57
See application file for complete search history.

(56) References Cited

U.S. PATENT DOCUMENTS

| 8,718,087 B1 * | 5/2014 | Johnston | H04L 12/12 370/463 |
| 11,086,997 B1 * | 8/2021 | Stephenson | G06F 21/64 |

(Continued)

FOREIGN PATENT DOCUMENTS

| CN | 107430628 A | 12/2017 |
| WO | 2016/155474 A1 | 10/2016 |

OTHER PUBLICATIONS

Office action dated Nov. 17, 2021 for TW application No. 110102840, filing date: Jan. 26, 2021, pp. 1-11.

*Primary Examiner* — Getente A Yimer
(74) *Attorney, Agent, or Firm* — Winston Hsu

(57) ABSTRACT

A computing apparatus includes a first processing circuit and a second processing circuit. The first processing circuit includes a programmable logic circuit. The second processing circuit includes a general purpose processor that is used to execute an application program to download a bitstream to the first processing circuit for programming the programmable logic circuit to implement a direct memory access (DMA) engine and at least one physical engine (PE). The DMA engine is used to access a first memory through a DMA manner. The at least one PE is used to read data to be processed from the first memory through the DMA engine. The first processing circuit and the second processing circuit are disposed in one chip.

19 Claims, 12 Drawing Sheets

(51) Int. Cl.
  *H04L 67/1097* (2022.01)
  *H04L 67/00* (2022.01)
  *G06F 15/78* (2006.01)

(56) References Cited

U.S. PATENT DOCUMENTS

| | | | |
|---|---|---|---|
| 2009/0304361 A1* | 12/2009 | Chan | H04N 21/426 |
| | | | 386/356 |
| 2010/0005470 A1* | 1/2010 | Simon | G06F 13/30 |
| | | | 718/103 |
| 2016/0292101 A1 | 10/2016 | Egi | |
| 2019/0108295 A1* | 4/2019 | Atta | G06F 30/3312 |

* cited by examiner

COMPUTING APPARATUS UTILIZING PROGRAMMABLE LOGIC CIRCUIT TO IMPLEMENT DIRECT MEMORY ACCESS ENGINE AND AT LEAST ONE PHYSICAL ENGINE AND PROVIDING DATA TO BE PROCESSED TO AT LEAST ONE PHYSICAL ENGINE THROUGH DIRECT MEMORY ACCESS ENGINE

CROSS REFERENCE TO RELATED APPLICATIONS

This application claims the benefit of U.S. provisional application No. 62/993,727, filed on Mar. 24, 2020 and incorporated herein by reference.

BACKGROUND OF THE INVENTION

1. Field of the Invention

The present invention is related to data processing, and more particularly, to a computing apparatus utilizing a programmable logic circuit to implement a direct memory access (DMA) engine and at least one physical engine (PE) and providing data to be processed to the at least one physical engine through the DMA engine.

2. Description of the Prior Art

According to traditional computer architecture, a storage device may perform data transaction with a central processing unit (CPU) through a bus. For example, a solid-state drive (SSD) can be connected to a Peripheral Component Interconnect Express (PCIe) bus or a Serial Advanced Technology Attachment (SATA) bus. In this way, the CPU of a host side can write data to the SSD of the host side through the PCIe bus/SATA bus, and the SSD of the host side can also transmit stored data to the CPU of the host side through the PCIe bus/SATA bus. In addition, with the development of network technology, the storage device can be deployed at a remote side and connected to the host side through the network. In this way, the CPU of the host side can write the data to the storage device of the remote side through the network, and the storage device of the remote side can also transmit the stored data to the CPU of the host side through the network.

Whether the storage device is installed on the host side or deployed at the remote side, the applications running on the CPU will need to read data from the storage device for processing according to the traditional computer architecture. Since performing data movement through the CPU takes a lot of time, an innovative computing apparatus is urgently needed for enhancing the efficiency of data processing.

SUMMARY OF THE INVENTION

It is therefore an objective of the present invention to provide a computing apparatus utilizing a programmable logic circuit to implement a DMA engine and at least one PE and providing data to be processed to the at least one PE through the DMA engine. In this way, the time required for data movement may be greatly reduced to improve data processing performance.

In an embodiment of the present invention, a computing apparatus is provided. The computing apparatus includes a first processing circuit and a second processing circuit. The first processing circuit includes a programmable logic circuit. The second processing circuit includes a general purpose processor, and is arranged to execute an application program, and download a bitstream to the first processing circuit for programming the programmable logic circuit to implement a DMA engine and at least one PE. The DMA engine is arranged to access a first memory through a DMA manner. The at least one PE is arranged to read data to be processed from the first memory through the DMA engine. The first processing circuit and the second processing circuit are disposed in one chip.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
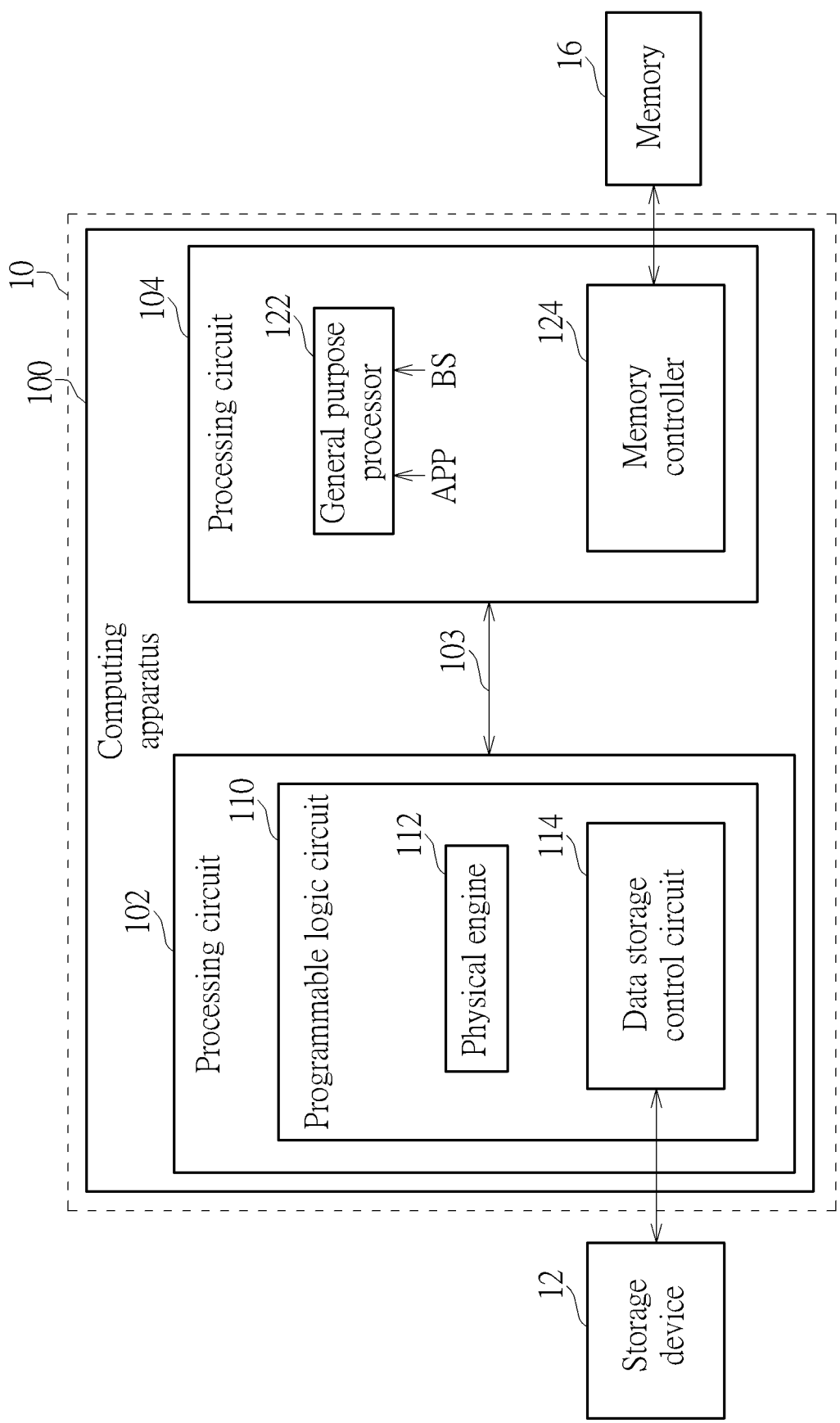
FIG. 1 is a diagram illustrating a computing apparatus according to an embodiment of the present invention.

FIG. 1 is a diagram illustrating a computing apparatus according to an embodiment of the present invention. A computing apparatus 100 includes processing circuits 102, 104. In this embodiment, the processing circuits 102, 104 are disposed in a same chip 10. For example, the chip 10 may be a multiprocessor system on a chip (MPSoC), but the present invention is not limited thereto. According to MPSoC architecture, the processing circuit 104 acts as a processing system (PS), and includes a general purpose processor 122, a memory controller 124, and other circuits (not shown). The general purpose processor 122 includes at least one processor core. For example, the general purpose processor 122 may have multiple processor cores and include an application processor unit (APU) implemented by ARM Cotex-A53 and a real-time processor unit (RPU) implemented by ARM Cotex-R5. In addition, the memory controller 124 is arranged to control data access of a memory 16. For example, the memory 16 may be a dynamic random access memory (DRAM).

The general purpose processor 122 in the processing circuit 104 may execute an application program APP to download a bitstream BS to the processing circuit 102 for programming a programmable logic circuit 110. For example, the programmable logic circuit 110 is a field programmable gate array (FPGA), and the bitstream. BS is a file that contains the programming information for the FPGA. As shown in FIG. 1, the processing circuit 102 and the processing circuit 104 may communicate with each other through a transmission interface 103. For example, the transmission interface 103 may be an advanced extensible interface (AXI). According to programming based on the bitstream BS, the programmable logic circuit 110 in this embodiment may include at least one physical engine (PE) 112 and a data storage control circuit 114. The data storage control circuit 114 is arranged to control data access of a storage device 12. For example, the storage device 12 may be a hard disk drive (HDD) or a solid-state drive (SSD). In addition, the storage device 12 may be applicable to object storage. In contrast to file storage, the object storage is a non-hierarchical data storage method that does not use a directory tree, and discrete data units (objects) exist at the same level in the storage area, wherein each object has a unique identifier for the application program to retrieve the object, and the object storage is widely used by cloud storage. As a result, the computing apparatus 100 provided in the present invention may further be applicable to data processing of an object storage device. For example, the storage device 12 may be arranged to hold a key-value store (key-value database) of a distributed storage system. In addition, the data storage control circuit 114 may also be arranged to control data access of the memory 16.

Figure 2:
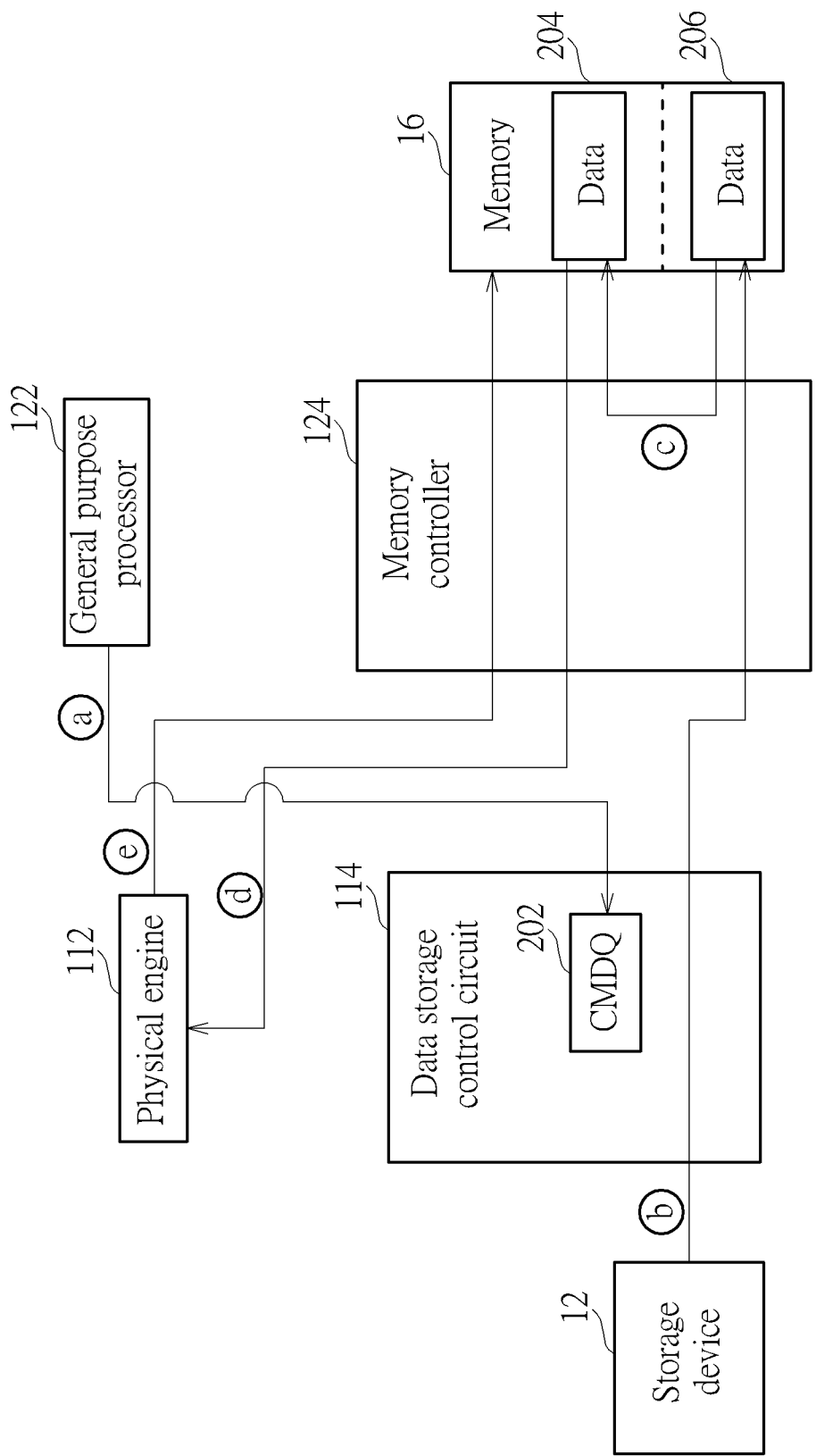
FIG. 2 is a diagram illustrating communication between the physical engine and the data storage control circuit shown in FIG. 1.

The physical engine 112 implemented by the programmable logic circuit 110 may act as an accelerator circuit, which is mainly designed to provide a hardware data processing acceleration function. Therefore, the data to be processed by the physical engine 112 may be provided by the data storage control circuit 114. Please refer to FIG. 2 in conjunction with FIG. 1. FIG. 2 is a diagram illustrating communication between the physical engine (e.g. accelerator circuit) 112 and the data storage control circuit 114 shown in FIG. 1. In step a, the general purpose processor 122 executes the application program APP and sends a command (e.g. Get(key)) to the data storage control circuit 114. In an embodiment, a command queue (labeled as CMDQ in FIG. 2) 202 may be set in the data storage control circuit 114 to temporarily store each command issued from the general purpose processor 122 for improving the command execution performance; however, the present invention is not limited thereto. In other embodiments, the data storage control circuit 114 may be modified to omit the command queue 202. In step b, the data storage control circuit 114 reads a data (e.g. a corresponding value in the key-value store that matches a key as indicated by the command) from the storage device 12 according to the command (e.g. Get(key)) in the command queue 202, and writes the data to a storage space 206 that is reserved in the memory 16 for the processing circuit 102. For example, the data storage control circuit 114 may use a direct memory access (DMA) description table to access the memory 16, wherein the DMA description table may record address information through physical region page (PRP) or scatter/gatter list (SGL). In step c, the memory controller 124 reads the data from the storage space 206 in the memory 16, and writes the data to a storage space 204 that is allocated in the memory 16 for use by the processing circuit 104. In step d, the memory controller 124 then reads the data from the storage space 204 in the memory 16, and transmits the data to the physical engine 112 for hardware data acceleration computation. In step e, the physical engine 112 writes a computing result of the data to the storage space 204 in the memory 16 through the memory controller 124.

As shown in FIG. 2, after data to be processed by the physical engine 112 is read from the storage device 12, the data is transmitted to the memory 16 used by the side of the processing circuit 104, and then transmitted to the physical engine 112 by the memory 16 used by the side of the processing circuit 104. However, these data transfer operations seriously degrade the data processing performance. To address this issue, the present invention further provides a communication mechanism between the storage device (e.g. HDD or SSD) and the physical engine (e.g. accelerator circuit).

Figure 3:
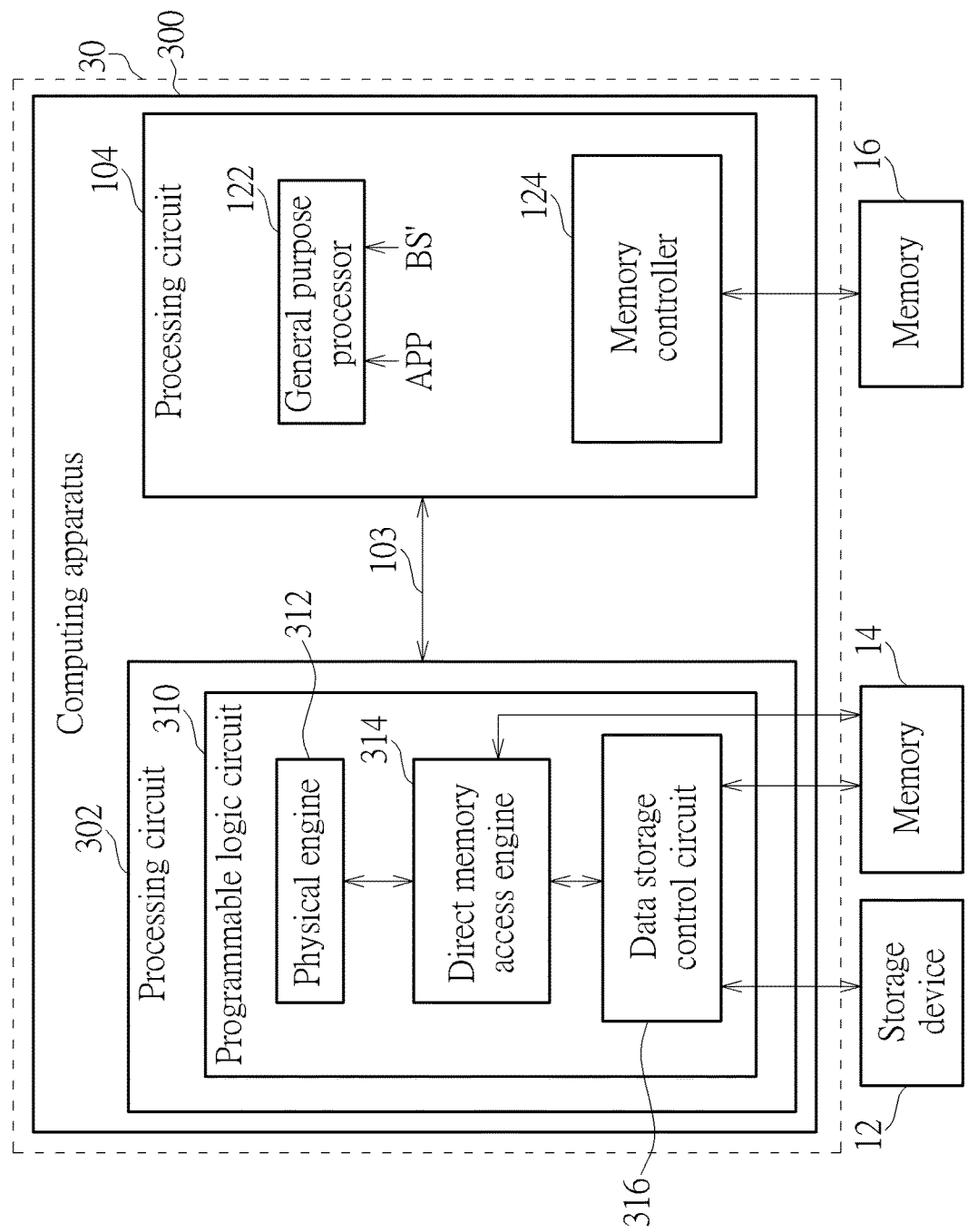
FIG. 3 is a diagram illustrating a computing apparatus according to another embodiment of the present invention.

FIG. 3 is a diagram illustrating a computing apparatus according to another embodiment of the present invention. A computing apparatus includes processing circuits 104, 302. In this embodiment, the processing circuits 104, 302 are disposed in a same chip 30. For example, the chip 30 may be an MPSoC; however, the present invention is not limited thereto. According to MPSoC architecture, the general purpose processor 122 in the processing circuit 104 may execute an application program APP to download a bitstream BS' to the processing circuit 302 for programming a programmable logic circuit 310. For example, the programmable logic circuit 310 is an FPGA, and the bitstream BS' is a file that contains the programming information for the FPGA. As shown in FIG. 3, the processing circuit 302 and the processing circuit 104 may communicate with each other through a transmission interface (e.g. AXI) 103. According to programming based on the bitstream BS', the programmable logic circuit 310 in this embodiment may include at least one physical engine 312, a direct memory access (DMA) engine 314, and a data storage control circuit 316. The DMA engine 314 is arranged to access a memory 14 used by the processing circuit 302 through a DMA manner. For example, the memory 14 may be a DRAM. The data storage control circuit 316 is arranged to control data access of the storage device 12 and data access of the memory 14. In addition, the computing apparatus 300 provided by the present invention may be applicable to data processing of the object storage device. For example, the storage device 12 may be arranged to hold the key-value store of the distributed storage system.

Figure 4:
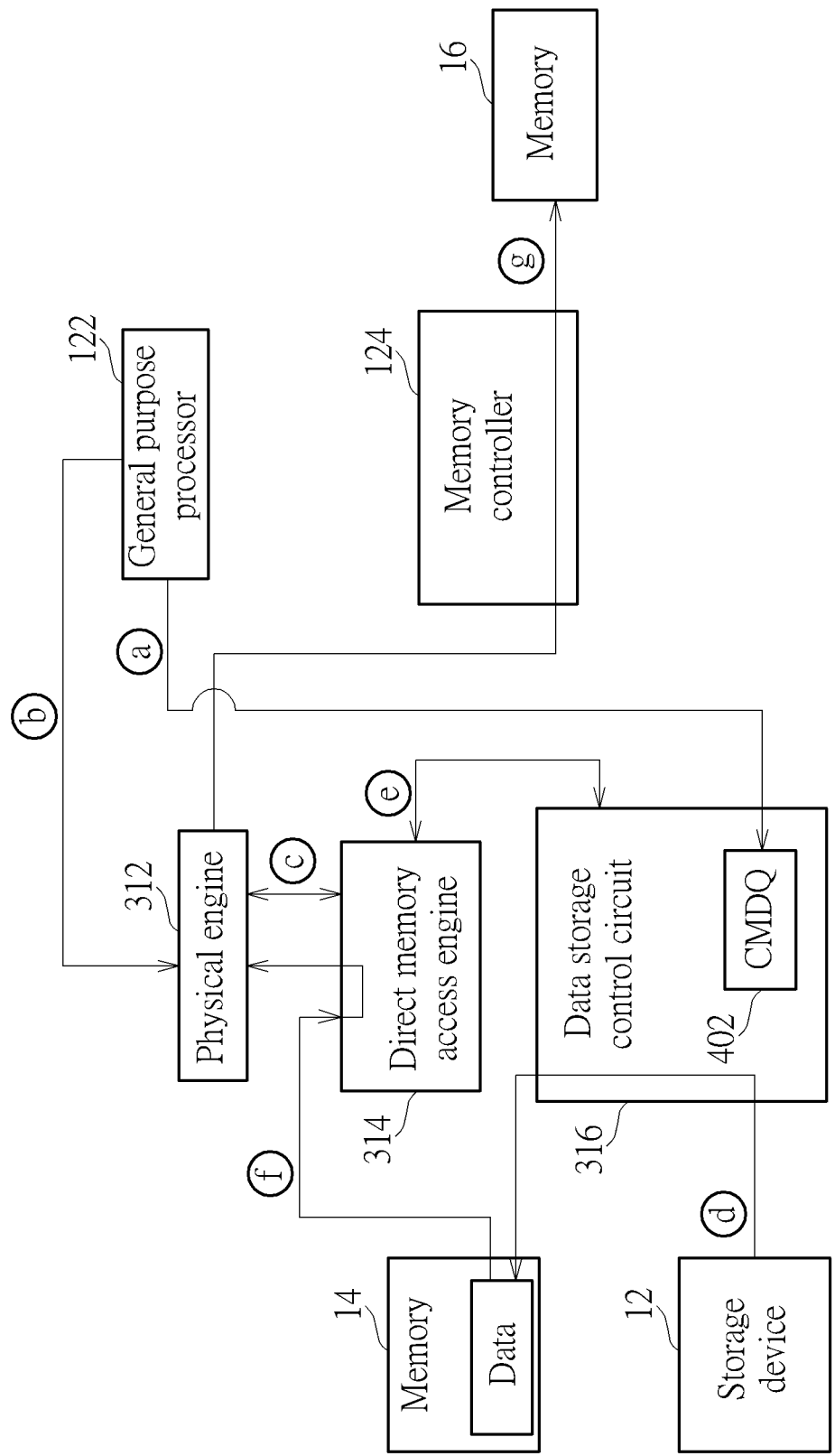
FIG. 4 is a diagram illustrating communication between the physical engine and the data storage control circuit shown in FIG. 3 according to an embodiment of the present invention.

In this embodiment, the physical engine 312 implemented by the programmable logic circuit 310 may act as an accelerator circuit, which is mainly designed to provide a hardware data processing acceleration function. The data storage control circuit 316 may read data to be computed by the physical engine 312 from the storage device 12 and write the data to the memory 14. The memory 14 may be arranged to act as a buffer of the physical engine 312, and the physical engine 312 may read data to be processed from the memory 14 through the DMA engine 314. Please refer to FIG. 3 in conjunction with FIG. 4. FIG. 4 is a diagram illustrating communication between the physical engine (e.g. accelerator circuit) 312 and the data storage control circuit 316 shown in FIG. 3 according to an embodiment of the present invention. In step a, the general purpose processor 122 executes an application program APP and sends a command (e.g. Get(key)) to the data storage control circuit 316. In an embodiment, the data storage control circuit 316 may set a command queue (labeled as CMDQ in FIG. 4) 402 to temporarily store each command issued from the general purpose processor 122 for improving the command execution performance; however, the present invention is not limited thereto. In other embodiments, the data storage control circuit 316 may modified to omit the command queue 402. In step b, the general purpose processor 122 executes the application program APP to write a physical engine identifier (PEID) to the physical engine 312. For example, a register is programmed and implemented in the physical engine 122, and may be arranged to store the PEID. In step c, the physical engine 312 writes the PEID to the DMA engine 314 for setting a DMA channel, and then triggers hardware data acceleration computations. In step d, the data storage control circuit 316 reads a data from the storage device 12 according to the command (e.g. Get(key)) in the command queue 402, and writes the data to the memory 14 on the side of the processing circuit 302. In step e, the data storage control circuit 316 synchronizes data storage location and data length information (e.g. DMA description table) regarding the DMA engine 314. In step f, when the data length reaches a predetermined threshold, the DMA engine 314 starts to read the data from the memory 14 through a DMA manner and transmit the data to the physical engine 312 for hardware data acceleration computations. In step g, the physical engine 312 writes a computing result of the data to the memory 16 on the side of the processing circuit 104 through the memory controller 124.

As shown in FIG. 4, after data to be processed by the physical engine 312 is read from the storage device 12, the data is first transmitted to the memory 14 used by the side of the processing circuit 302 (i.e. the memory close to the processing circuit 302), and then the DMA engine 314 reads the data from the memory 14 and transmits the data to the physical engine 312 for processing. Since the data does not need to be transmitted from the storage device 12 to the memory 16 used by the side of the processing circuit 104 (i.e. the memory close to the processing circuit 104), the time required for data movement may be greatly reduced to improve data processing performance.

The communication mechanism between the storage device (e.g. HDD or SSD) and the physical engine (e.g. accelerator circuit) shown in FIG. 4 may be represented by the following pseudo code:

```
BEGIN
    fp = OPEN('dir')                # open file in "dir" location
    pe = DOWNLOAD(bit_file)         # download bitstream to PL and get pe
    class
    ALLOCATE inBuf, outBuf          # dram for keys and output result
    COPY(fp, inBuf)                 # load file content to buffer
        pe.SETID(PEID)              # set Physical Engine ID and join PE to VDMA
        pe.START( )                 #after configure out PE and then start
        calculation
    for keyx in inBuf:
    GET(keyx, PEID)                 # send command to KV storage
        pe.WAIT( )                  # wait for calculation end
        outBuf = pe.TX( )           # get result
END
```

In the embodiment shown in FIG. 4, the physical engine 312 writes a final computing result of the data to the memory 16 on the side of the processing circuit 104 through the memory controller 124. In another embodiment, the DMA engine 314 reads the data from the memory 14 and transmits the data to the physical engine 312 for hardware data acceleration computations. The physical engine 312 writes a final computing result of the data back to the memory 14 through the DMA engine 314, and then the data storage control circuit 316 reads the final computing result of the data from the memory 14 and writes the final computing result of the data to the storage device 12. As mentioned before, the storage device 12 may hold the key-value store. As a result, the final computing result of the data acts as a value and is written into the key-value store, and then the general purpose processor 122 may execute the application program APP to send the command (e.g. Get(key)) for reading back the final computing result of the data from the storage device 12 through the key matching the final computing result of the data.

In addition, in the above-mentioned two embodiments of the communication mechanism between the storage device (e.g. HDD or SSD) and the physical engine (e.g. accelerator circuit), the memory 14 may also act as a temporary buffer of the physical engine 312. As a result, during the process in which the physical engine 312 processes the data, the physical engine 312 may further write temporary computing result (s) of the data to the memory 14 through the DMA engine 314.

The computing apparatus 100/300 is capable of accessing the storage device 12, and is capable of providing hardware data acceleration computations due to having the physical engine 112/312. Therefore, the computing apparatus 100/300 and the storage device 12 may jointly act as a computational storage device. In an embodiment, the computing apparatus of the present invention may be equipped with network access capability. As a result, a remote host may transmit data, programs, etc. to the computing apparatus through a network (e.g. a local area network), and may execute and complete the required data analysis through the computing apparatus.

Figure 5:
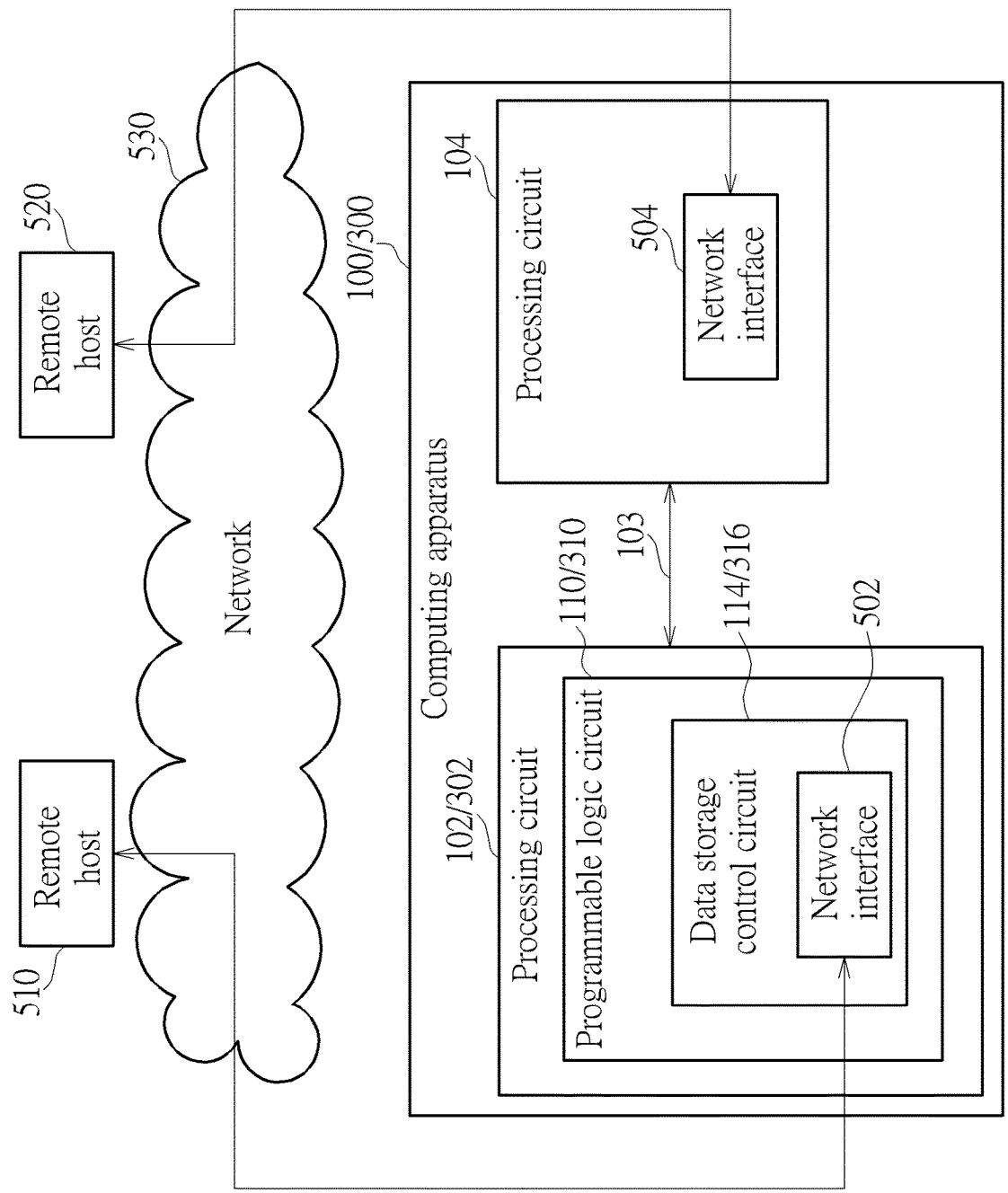
FIG. 5 is a diagram illustrating a communication mechanism between a computing apparatus and a remote host according to a first embodiment of the present invention.

FIG. 5 is a diagram illustrating a communication mechanism between a computing apparatus and a remote host according to a first embodiment of the present invention. In addition to the general purpose processor 122 and the memory controller 124, the processing circuit 104 further includes a network interface 504. The data storage control circuit 114/316 includes a network interface 502. For example, the network interface 502 implemented by the programmable logic circuit 110/310 may include a media access control (MAC) circuit and a transmission control protocol/internet protocol (TCP/IP) offload engine. In addition, the processing circuit 104 has an appropriate library installed therein, such as Xilinx Python productivity for Zynq (PYNQ). In this way, the application program. APP running on the processing circuit 104 may control the programmable logic circuit 110/310 in the processing circuits 102/302 through the appropriate library. In this embodiment, a remote host 520 transmits the application program APP and the bitstream BS/BS' to the processing circuit 104 through a network (e.g. a local area network) 530, that is, the network interface 504 of the processing circuit 104 downloads the application program APP and the bitstream BS/BS' through the network 530. Furthermore, a remote host 510 transmits data (e.g. database data) to the processing circuit 102/302 through the network 530, that is, the network interface 502 of the processing circuit 102/302 receives data (e.g. database data) to be written to the storage device 12 from the remote host 510 through the network 530.

It is assumed that the storage device 12 of this embodiment is used as an object storage device. For example, the storage device 12 is arranged to hold a key-value store, and the remote host 520 further transmits a key file to the processing circuit 104 through the network 530. The key file may be referenced and used by the processing circuit 104 to read data to be processed (i.e. a value matching a certain key) from the key-value store in the storage device 12. For example, the application program APP executed by the processing circuit 104 may parse the key file to obtain a plurality of keys and write the plurality of keys into a key buffer allocated in the memory 16.

The application program APP executed by the general purpose processor 122 in the processing circuit 104 downloads the bitstream BS/BS' to the processing circuits 102/302 through the appropriate library (e.g. Xilinx PYNQ). In addition, the application program APP executed by the general purpose processor 122 further allocates an output buffer in the memory 16 for storing data computing results generated from the physical engines 112/312 in the processing circuits 102/302, and triggers the hardware data acceleration computation operations of the physical engines 112/312. As mentioned before, the application program APP executed by the general purpose processor 122 sends a command (e.g. Get(key)); as a result, a key in the key buffer is used as one parameter of the command and is transmitted to the data storage control circuit 114/316 for reading a data (i.e. a value corresponding to the key) from the storage device 12 through the data storage control circuit 114/316 and transmitting the data to the physical engines 112/312 for processing. Afterwards, the physical engines 112/312 writes a computing results of the data (i.e. the value corresponding to the key) to the output buffer in the memory 16. In practice, the application program APP executed by the general purpose processor 122 may sequentially send a plurality of keys to the data storage control circuit 114/316. As a result, the physical engine 112/312 writes computing results of a plurality of data (i.e. a plurality of values corresponding to the plurality of keys, respectively) to the output buffer on the memory 16. The application program. APP executed by the general purpose processor 122 generates a log file according to a plurality of computing results stored by the output buffer in the memory 16, and returns the log file to the remote host 520 through the network 530.

Figure 6:
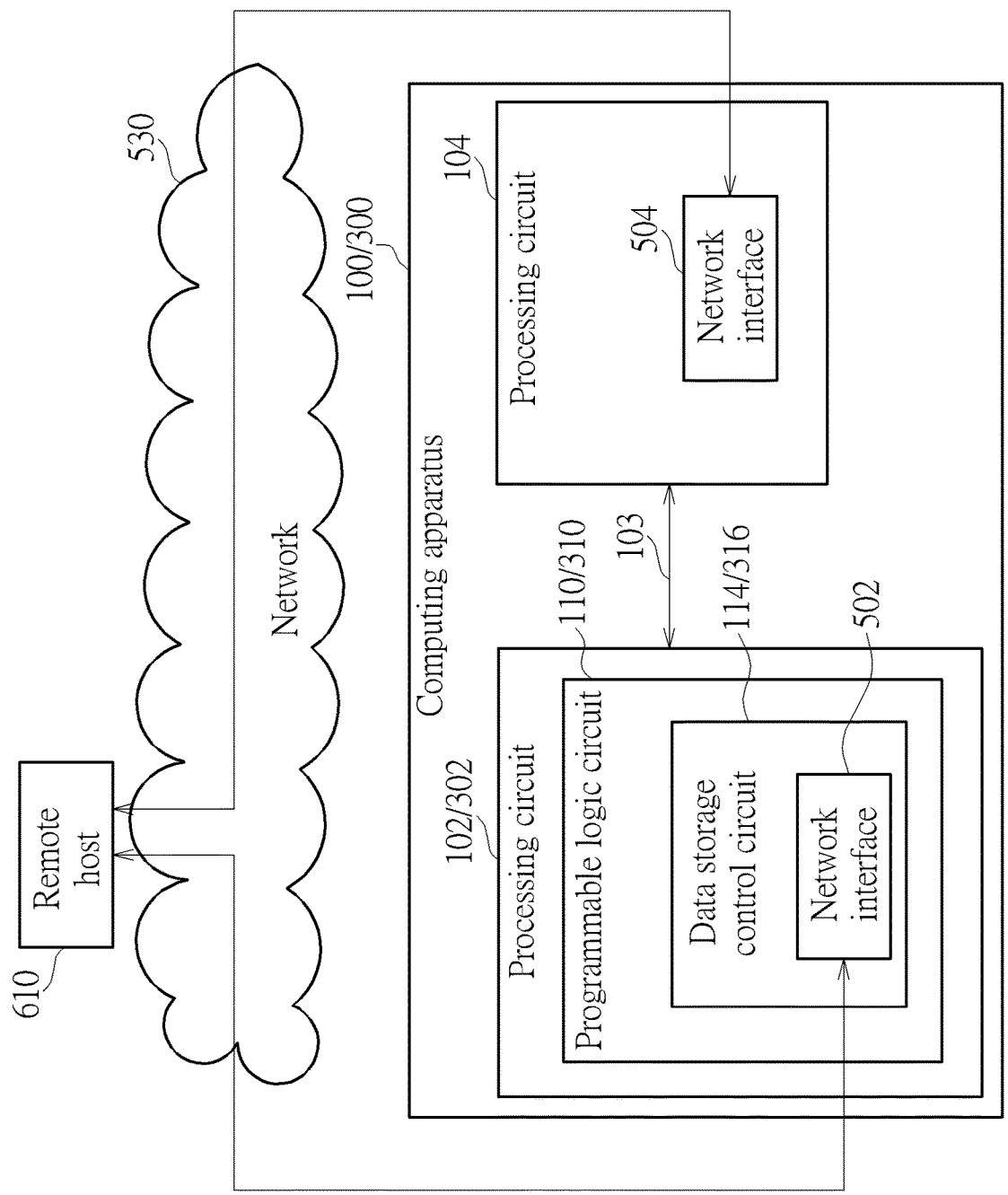
FIG. 6 is a diagram illustrating a communication mechanism between a computing apparatus and a remote host according to a second embodiment of the present invention.

In the embodiment shown in FIG. 5, data (e.g. database data) and programs (e.g. application program and bitstream) are provided by different remote hosts, respectively; however, the present invention is not limited thereto. In other embodiments, the data (e.g. database data) and the programs (e.g. application program and bitstream) may be provided by only a single remote host. FIG. 6 is a diagram illustrating a communication mechanism between a computing apparatus and a remote host according to a second embodiment of the present invention. In this embodiment, a remote host 610 transmits the application program APP and the bitstream BS/BS' to the processing circuit 104 through the network 530, that is, the network interface 504 of the processing circuit 104 downloads the application program APP and the bitstream BS/BS' through the network 530. In addition, the same remote host 610 further transmits data (e.g. database data) to the processing circuit 102/302 through the network 530, that is, the network interface 502 of the processing circuit 102/302 receives the data (e.g. database data) to be written to the storage device 12 from the remote host 610 through the network 530. It is assumed that the storage device 12 in this embodiment is used as an object storage device. For example, the storage device 12 is arranged to hold a key-value store, and the remote host 610 further transmits a key file to the processing circuit 104 through the network 530 for subsequently reading the key-value store.

Figure 7:
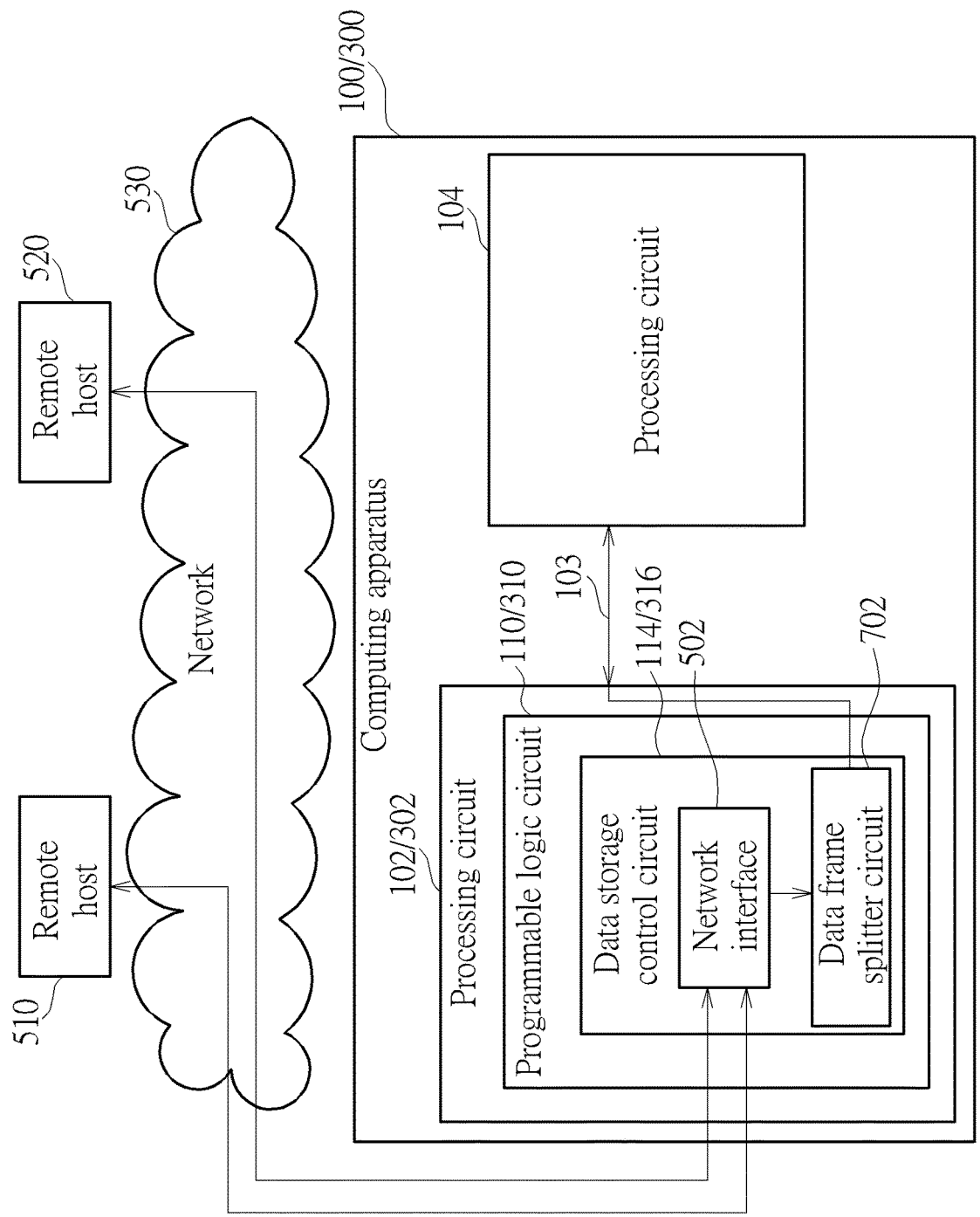
FIG. 7 is a diagram illustrating a communication mechanism between a computing apparatus and a remote host according to a third embodiment of the present invention.

In the embodiments shown in FIGS. 5 and 6, the processing circuit 102/302 itself has the network interface 502, and the processing circuit 104 itself has the network interface 504; however, the present invention is not limited thereto. In other embodiments, the computing apparatus in the present invention may have only one processing circuit with the network interface. FIG. 7 is a diagram illustrating a communication mechanism between a computing apparatus and a remote host according to a third embodiment of the present invention. The data storage control circuit 114/316 includes the above-mentioned network interface 502, and further includes a data frame splitter circuit 702. The processing circuit 104 has an appropriate library (e.g. Xilinx PYNQ) installed therein. In this way, the application program running on the processing circuit 104 may control the programmable logic circuit 110/310 in the processing circuit 102/302 through the appropriate library. In this embodiment, the remote host 520 transmits the application program APP and the bitstream BS/BS' to the processing circuit 104 through the network 530 and the processing circuit 102/302. That is, the network interface 502 of the processing circuit 102/302 downloads the application program APP and the bitstream BS/BS' through the network 530, and the data frame splitter circuit 702 may split/separate the application program APP and the bitstream BS/BS' according to information (e.g. network address information and port information) contained in data frames, and forward the application program APP and the bitstream BS/BS' to the processing circuit 104 through an appropriate network driver. Furthermore, the remote host 510 transmits data (e.g. database data) to the processing circuit 102/302 through the network 530, that is, the network interface 502 of the processing circuit 102/302 receives the data to be written to the storage device 12 (e.g. database data) from the remote host 510 through the network 530. At this moment, according to information (e.g. network address information and port information) contained in data frames, the data frame splitter circuit 702 determines that forwarding the data to be written to the storage device 12 (e.g. database data) to the processing circuit 104 is unnecessary.

It is assumed that the storage device 12 in this embodiment is used as an object storage device. For example, the storage device 12 is arranged to hold a key-value store, and the remote host 520 further transmits a key file to the processing circuit 104 through the network 530 and the processing circuit 102/302, that is, the network interface 502 of the processing circuit 102/302 downloads the key file through the network 530, and the data frame splitter circuit 702 may extract the key file according to information (e.g. network address information and port information) contained in data frames, and forward the key file to the processing circuit 104 through an appropriate network driver. The key file may be referenced and used by the processing circuit 104 to read data to be processed from the key-value store in the storage device 12. For example, the application program APP executed by the processing circuit 104 may parse the key file to obtain a plurality of keys and write the plurality of keys to a key buffer allocated in the memory 16.

The application program APP executed by the general purpose processor 122 in the processing circuit 104 downloads the bitstream BS/BS' to the processing circuit 102/302 through an appropriate library (e.g. Xilinx PYNQ). In addition, the application program APP executed by the general purpose processor 122 further allocates an output buffer in the memory 16 for storing data computing results generated from the physical engine 112/312 in the processing circuit 102/302, and triggers the hardware data acceleration computation operations of the physical engine 112/312. As mentioned before, the application program APP executed by the general purpose processor 122 sends a command (e.g. Get(key)); as a result, a key in the key buffer is used as one parameter of the command and is transmitted to the data storage control circuits 114/316 for reading a data (i.e. a value corresponding to the key) from the storage device 12 through the data storage control circuits 114/316 and transmitting the data to the physical engines 112/312 for processing. Afterwards, the physical engines 112/312 writes a computing result of the data (i.e. the value corresponding to the key) to the output buffer in the memory 16. In practice, the application program APP executed by the general purpose processor 122 may sequentially send a plurality of keys to the data storage control circuit 114/316. As a result, the physical engine 112/312 writes computing results of a plurality of data (i.e. a plurality of values corresponding to the plurality of keys, respectively) to the output buffer in the memory 16. The application program. APP executed by the general purpose processor 122 generates a log file according to a plurality of computing results stored by the output buffer in the memory 16, and returns the log file to the remote host 520 through the network 530.

Figure 8:
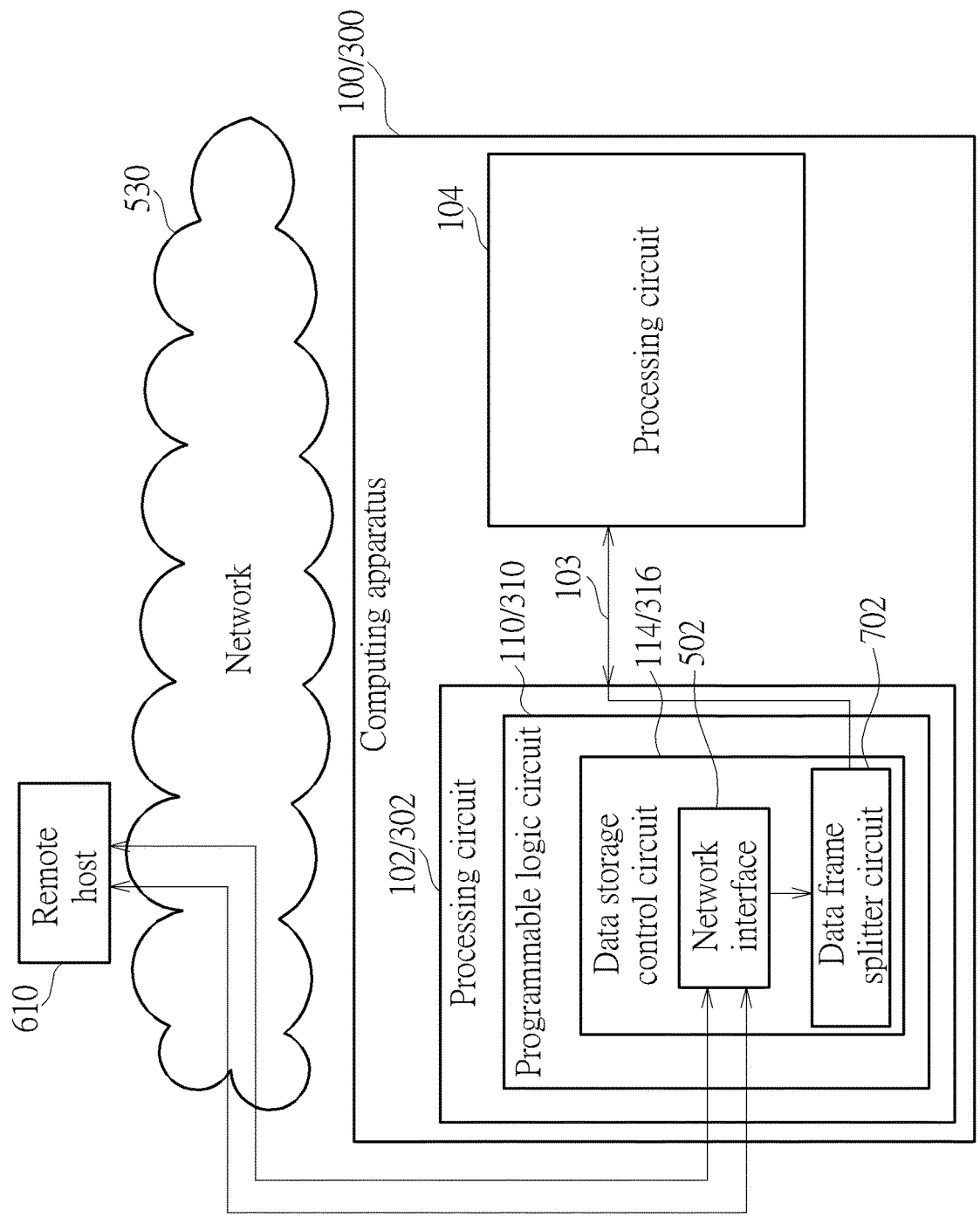
FIG. 8 is a diagram illustrating a communication mechanism between a computing apparatus and a remote host according to a fourth embodiment of the present invention.

In the embodiment shown in FIG. 7, data (e.g. database data) and programs (e.g. application program and bitstream) are provided by different remote hosts, respectively; however, the present invention is not limited thereto. In other embodiments, the data (e.g. database data) and the programs (e.g. application program and bitstream) may be provided by only a single remote host. FIG. 8 is a diagram illustrating a communication mechanism between a computing apparatus and a remote host according to a fourth embodiment of the present invention. In this embodiment, the remote host 610 transmits the application program APP and the bitstream BS/BS' to the processing circuit 104 through the network 530 and the processing circuit 102/302. That is, the network interface 502 of the processing circuit 102/302 downloads the application programAPP and the bitstream BS/BS' through the network 530, and then the application programAPP and the bitstream BS/BS' are forwarded to the processing circuit 104 through the data frame splitter circuit 702. In addition, the same remote host 610 further transmits data (e.g. database data) to the processing circuit 102/302 through the network 530, that is, the network interface 502 of the processing circuit 102/302 receives the data to be written to the storage device 12 (e.g. database data) from the remote host 610 through the network 530. It is assumed that the storage device 12 in this embodiment is used as an object storage device. For example, the storage device 12 is arranged to hold a key-value store, and the remote host 610 further transmits a key file to the processing circuit 104 through the network 530 and the processing circuits 102/302 for subsequently reading the key-value store.

In FIG. 5 to FIG. 8, there is one-to-one connection relationship between the remote host and the computing apparatus; however, the present invention is not limited thereto. In other embodiments, the computing apparatus 100/300 may support a distributed computing application. As a result, the processing circuit 104 may further execute the application program APP to act as a worker node of distributed computing architecture (e.g. Apache Spark). In other words, one-to-many connection relationship may exist between the remote host and the computing apparatuses. In an embodiment, the remote hosts 510, 520 may be connected to a plurality of computing apparatuses 100/300 (i.e. a plurality of worker nodes) through the network 530, and achieve distributed computing through the plurality of computing apparatuses 100/300, wherein each computing apparatus in the plurality of computing apparatuses 100/300 uses the network interface configuration shown in FIG. 5 (or FIG. 7). In another embodiment, the remote host 610 may be connected to a plurality of computing apparatuses 100/300 (i.e. a plurality of worker nodes) through the network 530, and achieve distributed computing through the plurality of computing apparatuses 100/300, wherein each computing apparatus in the plurality of computing apparatuses 100/300 uses the network interface configuration shown in FIG. 6 (or FIG. 8).

Figure 9:
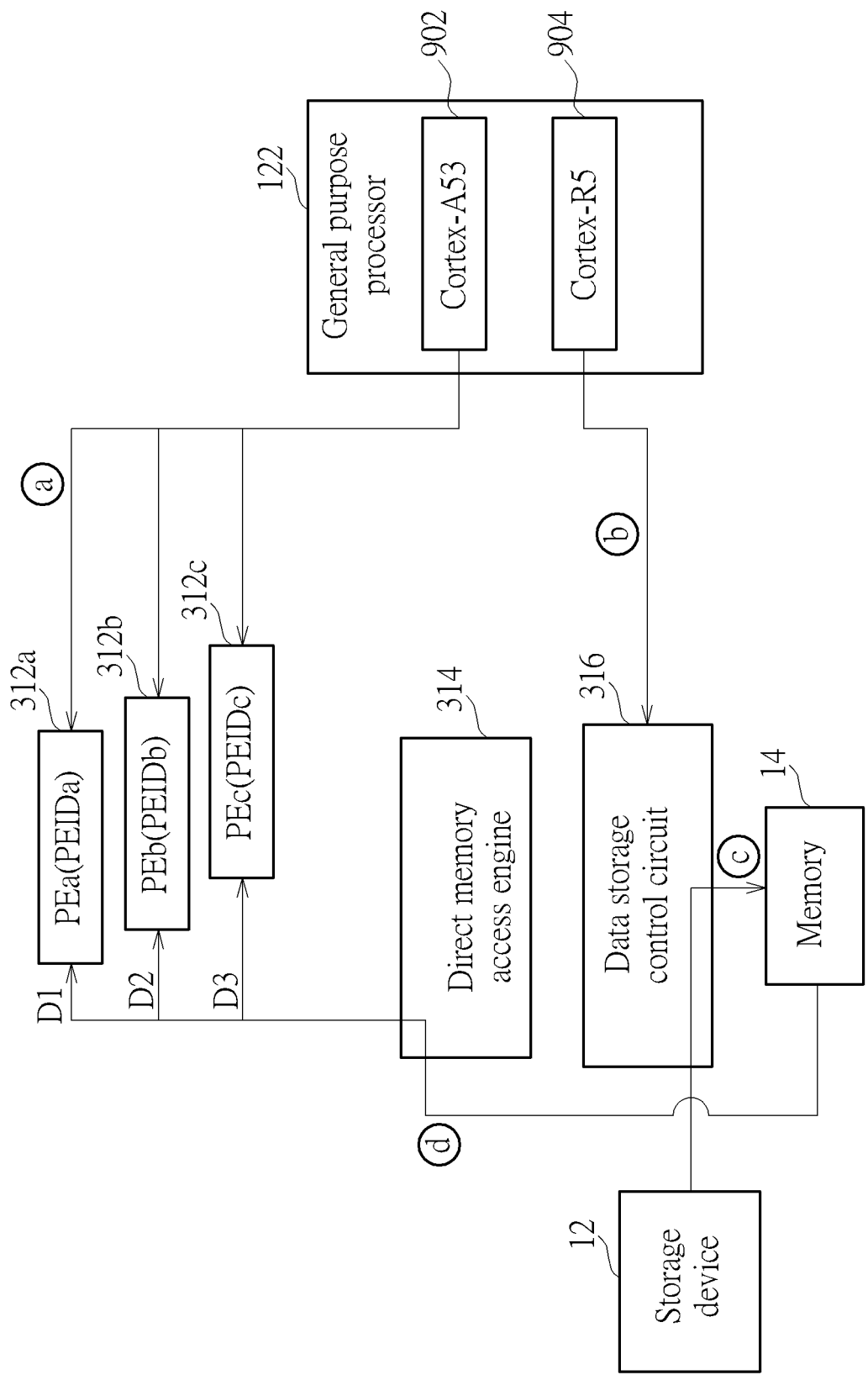
FIG. 9 is a diagram illustrating a communication mechanism of a plurality of physical engines and a data storage control circuit according to an embodiment of the present invention.

As mentioned before, the programmable logic circuit 310 may implement at least one physical engine 312 by programming. In practice, the programmable logic circuit 310 may determine the number of implemented physical engines 312 according to requirements. For example, the programmable logic circuit 310 may implement a plurality of physical engines 312 by programming, and these physical engines 312 may obtain data to be processed in the storage device 12 through the memory 14 on the side of the processing circuit 302. FIG. 9 is a diagram illustrating a communication mechanism of a plurality of physical engines (e.g. accelerator circuits) 312a, 312b, and 312c and the data storage control circuit 316 according to an embodiment of the present invention. In this embodiment, the programmable logic circuit 310 includes the plurality of physical engines 312a, 312b, and 312c (labeled as PEa, PEb, and PEc, respectively), and the general purpose processor 122 includes an APU 902 (labeled as Cortex-A53) and an RPU 904 (labeled as Cortex-R5). In step a, the APU 902 in the general purpose processor 122 writes different physical engine identifiers PEIDa, PEIDb, and PEIDc to different physical engines 312a, 312b, and 312c, respectively. For example, each of the physical engines 312a, 312b, and 312c has a register arranged to store a corresponding physical engine identifier. In step b, the RPU 904 in the general purpose processor 122 sends a plurality of commands GetCMD to the data storage control circuit 316, and each command GetCMD carries two parameters Key and PEID, wherein the parameter Key is arranged to read a corresponding value from the key-value store in the storage device 12, and the parameter PEID is arranged to indicate which physical engine is responsible for processing the corresponding value of the parameter Key. For example, the plurality of commands GetCMD include GetCMD(Key1, PEIDa), GetCMD(Key2, PEIDb), GetCMD(Key3, PEIDc), and GetCMD(Key4, PEIDc), etc. In step c, the data storage control circuit 316 refers to commands (e.g. GetCMD(Key1, PEIDa), GetCMD(Key2, PEIDb), and GetCMD(Key3, PEIDc)) to read data (e.g. a value D1 corresponding to a key Key1, a value D2 corresponding to a key Key2, and a value D3 corresponding to a key Key3) from the storage device 12 and write the data to the memory 14. The parameter PEID included in each command GetCMD may be written to the DMA engine 314. In step d, the DMA engine 314 may read data (e.g. D1, D2 and D3) from the memory 14 and dispatch the data to corresponding physical engines 312a, 312b, and 312c for computing according to the physical engine identifiers (e.g. PEIDa, PEIDb, and PEIDc).

Considering the flexibility of data processing, in another embodiment, the parameters carried in each command GetCMD issued by the general purpose processor 122 in step b may include the original parameters Key and PEID and other parameters (e.g. flow control flag bFlag). As a result, the plurality of commands GetCMD issued by the general purpose processor 122 may include GetCMD(Key1, PEIDa, bFlag), GetCMD(Key2, PEIDb, bFlag), GetCMD (Key3, PEIDc, bFlag), GetCMD(Key4, PEIDc, bFlag), etc. The flow control flag bFlag carried by each command GetCMD may be written to the DMA engine 314. In step d, the DMA engine 314 may refer to the physical engine identifiers (e.g. PEIDa, PEIDb, and PEIDc) and associated flow control flags bFlag to read data (e.g. D1, D2, and D3) from the memory 14 and dispatch the data to the corresponding physical engines 312a, 312b, and 312c for computing, wherein when the flow control flag bFlag carried by a certain command GetCMD is set as a predetermined value, the corresponding data (e.g. D1, D2, or D3) is partitioned into a plurality of data segments (e.g. a data segment with a fixed length of 4K Bytes), and the plurality of data segments are processed by the corresponding physical engine (e.g. 312a, 312b, or 312c). In an embodiment, data partitioning may be done in the DMA engine 314, and the plurality of data segments are sent to the corresponding physical engine (e.g. 312a, 312b, or 312c). In another embodiment, the DMA engine 314 may send unpartitioned data and associated control information to the corresponding physical engine (e.g. 312a, 312b, or 312c), and the data partitioning is executed by the corresponding physical engine (e.g. 312a, 312b, or 312c).

As mentioned before, the physical engine 112/312 in the programmable logic circuit 110/310 may be used as an accelerator circuit to perform the hardware data acceleration computations. According to the requirements of different applications, the physical engine 112/312 may provide additional processing during the transfer process of up traffic data between the storage device 12 and the remote host 510/520/610, and/or provide additional processing during the transfer process of down traffic data between the storage device 12 and the remote host 510/520/610. For example, operations provided by the physical engine 112/312 may include encryption, decryption, compression, decompression, statistical analysis, etc.

Figure 10:
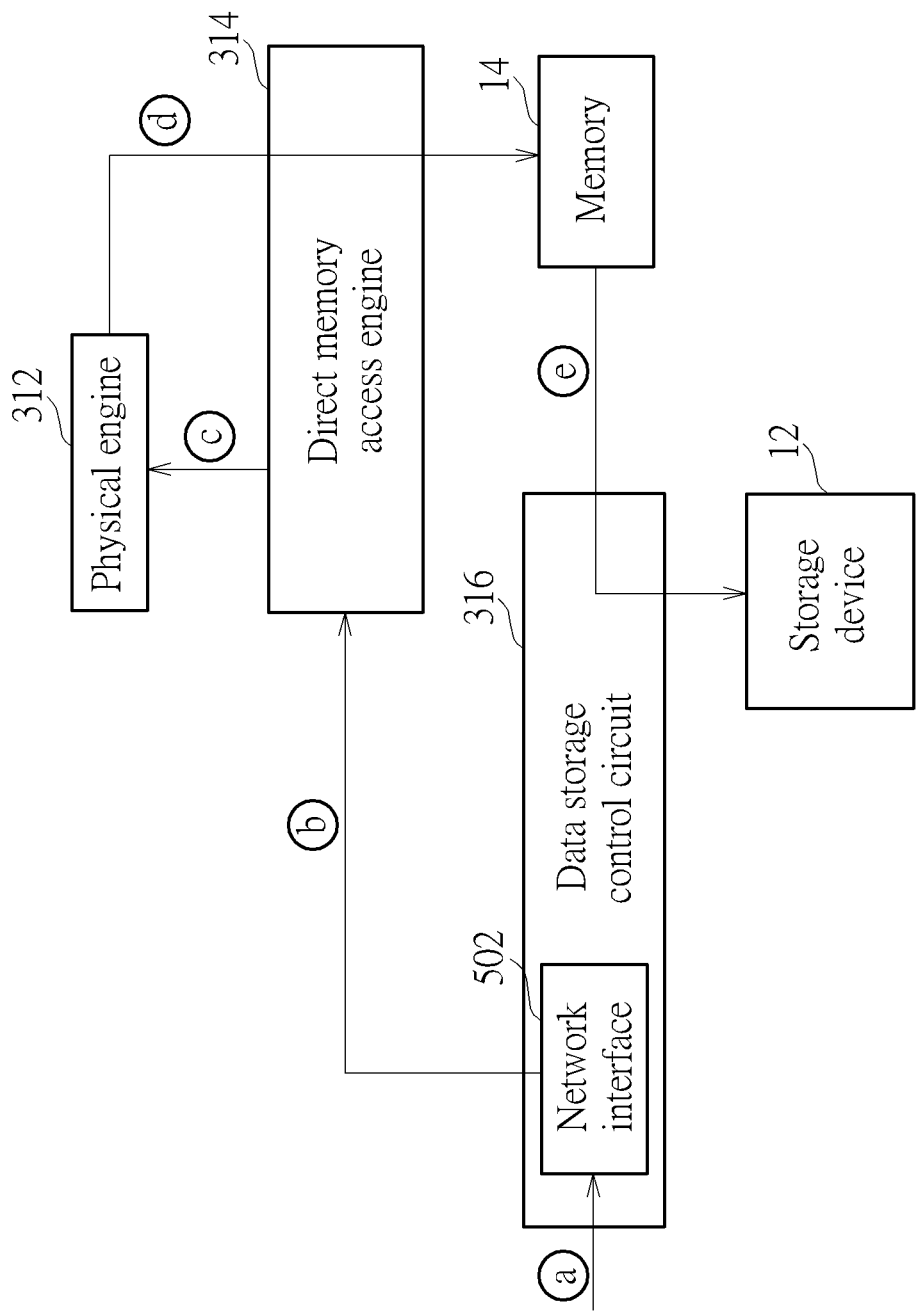
FIG. 10 is a diagram illustrating additional processing provided by the physical engine shown in FIG. 3 during the transfer process of down traffic data between a storage device and a remote host according to an embodiment of the present invention.

FIG. 10 is a diagram illustrating additional processing provided by the physical engine 312 shown in FIG. 3 during the transfer process of down traffic data between the storage device 12 and the remote host 510/520/610 according to an embodiment of the present invention. After the computing apparatus 300 receives the application program and the bitstream from the remote host and programs the programmable logic circuit 310 according to the bitstream, the programmable logic circuit 310 (which includes the physical engine 312, the DMA engine 314, and the data storage control circuit 316) may start to process a data write request (e.g. Put (Key, Data)) from the remote host. In step a, the remote host 510/610 sends command (e.g. Put (Key, Data)) and data to the network interface 502 through the network 530. In step b, the data storage control circuit 316 writes the data to an internal buffer of the DMA engine 314 according to the command. In step c, the DMA engine 314 sends the data in the internal buffer to the physical engine 312 for data processing (e.g. encryption, compression, or statistical analysis). After operations of the data processing are completed, in step d, the physical engine 312 writes a computing result of the data processing (e.g. encryption, compression, or statistical analysis) to the memory 14 through the DMA engine 314. In step e, the data storage control circuit 316 reads the computing result of the data processing (e.g. encryption, compression, or statistical analysis) from the memory 14 and writes the computing result of the data processing to the storage device 12.

Figure 11:
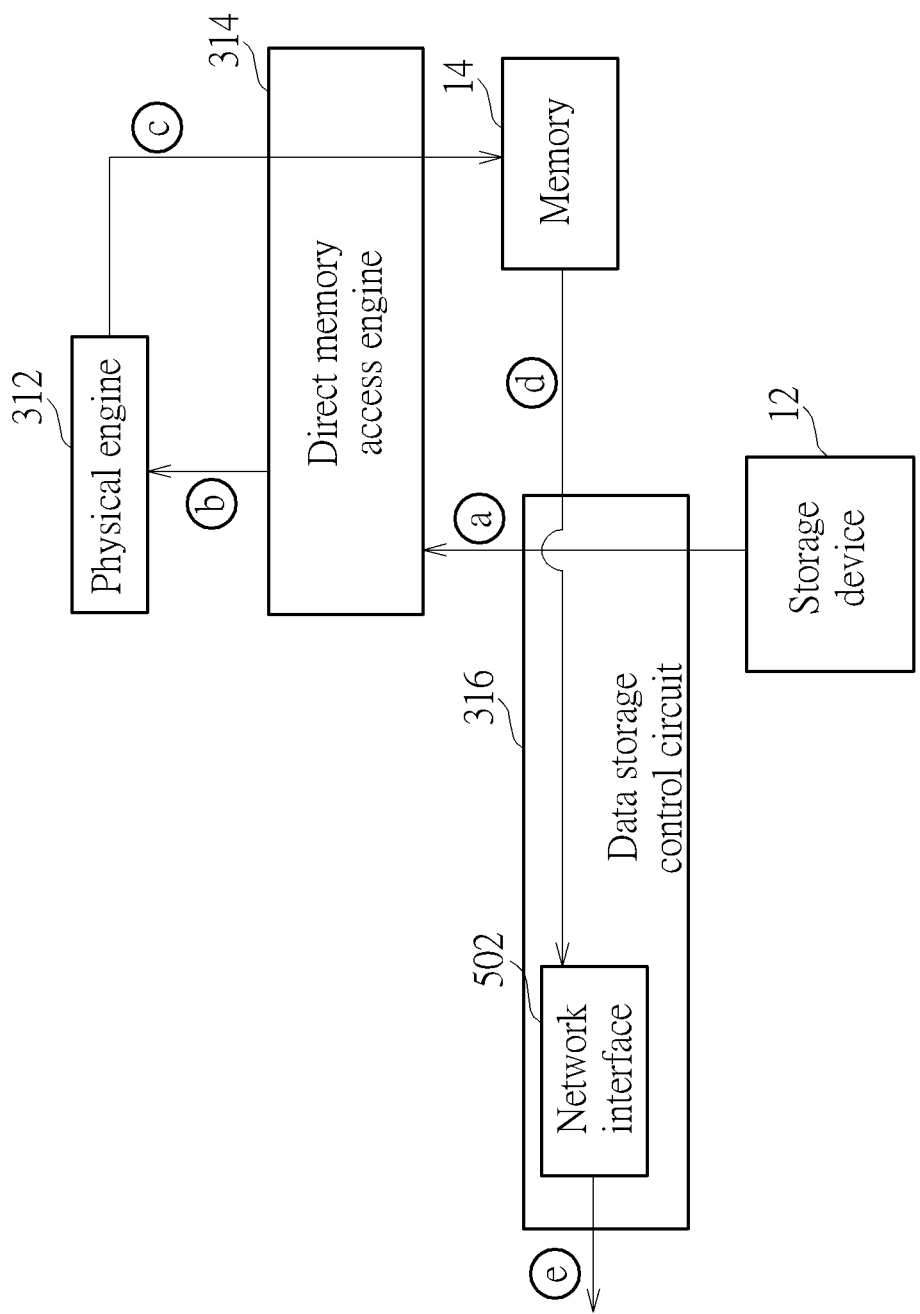
FIG. 11 is a diagram illustrating additional processing provided by the physical engine shown in FIG. 3 during the transfer process of up traffic data between a storage device and a remote host according to an embodiment of the present invention.

FIG. 11 is a diagram illustrating additional processing provided by the physical engine 312 shown in FIG. 3 during the transfer process of up traffic data between the storage device 12 and the remote host 510/520/610 according to an embodiment of the present invention. After the computing apparatus 300 receives the application program and the bitstream from the remote host and programs the programmable logic circuit 310 according to the bitstream, the programmable logic circuit 310 (which includes the physical engine 312, the DMA engine 314, and the data storage control circuit 316) may start to process a data read request (e.g. Get(Key)) from the remote host. In step a, the data storage control circuit 316 reads data from the storage device 12 and writes the data to an internal buffer of the DMA engine 314 according to the command (e.g. Get (Key)). In step b, the DMA engine 314 sends the data in the internal buffer to the physical engine 312 for data processing (e.g. decryption, decompression, or statistical analysis). After operations of the data processing are completed, in step c, the physical engine 312 writes a computing result of the data processing (e.g. decryption, decompression, or statistical analysis) to the memory 14 through the DMA engine 314. In step d, the data storage control circuit 316 reads the computing result of the data processing (e.g. decryption, decompression, or statistical analysis) from the memory 14 and sends the computing result of the data processing (e.g. decryption, decompression, or statistical analysis) to the network interface 502. In step e, the network interface 502 returns the computing result of the data processing (e.g. decryption, decompression, or statistical analysis) to the remote host 520/610 through the network 530.

Figure 12:
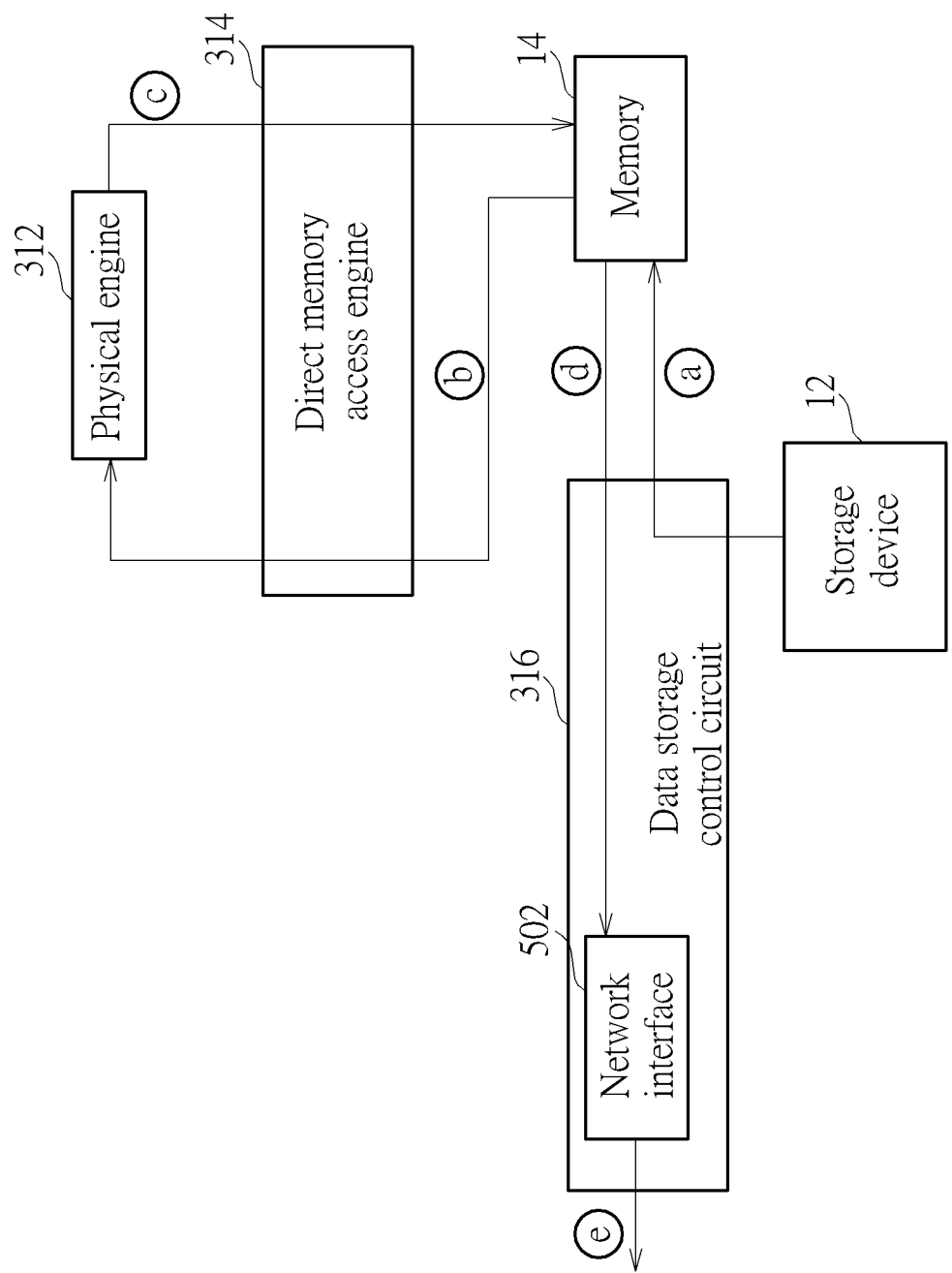
FIG. 12 is a diagram illustrating additional processing provided by the physical engine shown in FIG. 3 during the transfer process of up traffic data between a storage device and a remote host according to another embodiment of the present invention.

FIG. 12 is a diagram illustrating additional processing provided by the physical engine 312 shown in FIG. 3 during the transfer process of up traffic data between the storage device 12 and the remote host 510/520/610 according to another embodiment of the present invention. After the computing apparatus 300 receives the application program and the bitstream from the remote host and programs the programmable logic circuit 310 according to the bitstream, the programmable logic circuit 310 (which includes the physical engine 312, the DMA engine 314, and the data storage control circuit 316) may start to process a data read request (e.g. Get(Key)) from the remote host. In step a, the data storage control circuit 316 reads data from the storage device 12 and writes the data to the memory 14. In step b, the DMA engine 314 reads data from the memory 14 and sends the data to the physical engine 312 for data processing (e.g. decryption, decompression, or statistical analysis). After operations of the data processing are completed, in step c, the physical engine 312 writes a computing result of the data processing (e.g. decryption, decompression, or statistical analysis) to the memory 14 through the DMA engine 314. In step d, the data storage control circuit 316 reads the computing result of the data processing (e.g. decryption, decompression, or statistical analysis) from the memory 14 and sends the computing result of the data processing (e.g. decryption, decompression, or statistical analysis) to the network interface 502. In step e, the network interface 502 returns the computing result of the data processing (e.g. decryption, decompression, or statistical analysis) to the remote host 520/610 through the network 530.

In above-mentioned embodiments, the data storage control circuit 114/316 may include a network handler function block, a storage handler function block, and a memory handler function block, wherein the network handler function block is mainly responsible for providing network access capability (e.g. the network interface 502), the storage handler function block is mainly responsible for providing an interface which is arranged to communicate with the storage device 12 for access control of the storage device 12, and the memory handler function block is mainly responsible for providing an interface which is arranged to communicate with the memory 14 for access control of the memory 14; however, the present invention is not limited thereto. In practice, the data storage control circuit 114/316 may implement various function blocks to realize the required data storage control function according to requirements. That is, in addition to the network handler function block, the storage handler function block, and the memory handler function block, the data storage control circuit 114/316 may further include other function block(s).

In summary, the programmable logic circuit (e.g. FPGA) in the computing apparatus of the present invention may be programmed to set the data storage control circuit as an interface of object storage (e.g. key-value store). Compared with traditional file storage, the object storage may access data more efficiently. In addition, the programmable logic circuit (e.g. FPGA) in the computing apparatus of the present invention may be programmed to set a network interface, wherein the network interface may include a TCP/IP offload engine. As a result, the general purpose processor in the computing apparatus of the present invention does not need to intervene in TCP/IP stack processing. Furthermore, the programmable logic circuit (e.g. FPGA) in the computing apparatus of the present invention may be programmed to set physical engine(s) responsible for hardware data acceleration computations and a DMA engine responsible for providing data to be processed to the physical engine. Since the programmable logic circuit is close to the storage device (e.g. HDD or SSD), the programmable logic circuit may provide the data in the storage device to the physical engine more efficiently through the DMA engine. Furthermore, according to application requirements, the physical engine may further provide additional processing (e.g. encryption, decryption, compression, decompression, and/or statistical analysis) during the transfer process of up traffic data/down traffic data between the storage device and the remote host.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computing apparatus, comprising:
   a first processing circuit, comprising a programmable logic circuit; and
   a second processing circuit, comprising a general purpose processor, and arranged to execute an application program to download a bitstream to the first progressing circuit for programming the programmable logic circuit to implement:
     a direct memory access engine, arranged to directly access a first memory through a direct memory access manner; and
     at least one physical engine, arranged to read data to be processed from the first memory through the direct memory access engine;
   wherein the first processing circuit and the second processing circuit are disposed in one chip;
   wherein the bitstream programs the programmable logic circuit to further implement:
     a data storage control circuit, arranged to control data access of the first memory and a storage device;
     the second processing circuit issues a command to the data storage control circuit; the data storage control circuit refers to the command to read a data from the storage device and write the data to the first memory; and the direct memory access engine reads the data from the first memory and transmits the data to the at least one physical engine for processing.

2. The computing apparatus of claim 1, wherein the second processing circuit further comprises:
   a memory controller, arranged to control access of a second memory;
   the at least one physical engine further writes a final computing result of the data to
   the second memory through the memory controller.

3. The computing apparatus of claim 2, wherein during a process in which the at least one physical engine processes the data, the at least one physical engine further writes temporary computing results of the data to the first memory through the direct memory access engine.

4. The computing apparatus of claim 1, wherein the bitstream programs the programmable logic circuit to further implement:
   a data storage control circuit, arranged to control data access of the first memory and a storage device;
   the at least one physical engine further writes a final computing result of the data to the first memory through the direct memory access engine, and the data storage control circuit reads the final computing result of the data from the first memory and writes the final computing result of the data to the storage device.

5. The computing apparatus of claim 4, wherein during a process in which the at least one physical engine processes the data, the at least one physical engine further writes temporary computing results of the data to the first memory through the direct memory access engine.

6. The computing apparatus of claim 1, wherein the programmable logic circuit comprises a plurality of physical engines; the second processing circuit writes a plurality of physical engine identifiers to the plurality of physical engines, respectively; parameters of the command comprise a specific physical engine identifier; and the direct memory access engine reads the data from the first memory and transmits the data to a physical engine in the plurality of physical engines that corresponds to the specific physical engine identifier.

7. The computing apparatus of claim 1, wherein the parameters of the command comprise a flow control flag; and when the flow control flag is set as a predetermined value, the data is divided into a plurality of data segments, and the plurality of data segments are processed by the at least one physical engine, respectively.

8. The computing apparatus of claim 1, wherein the bitstream programs the programmable logic circuit to further implement:
a data storage control circuit, arranged to control data access of the first memory and a storage device, and receive a command and a data from a network;
the data storage control circuit transmits the data to the direct memory access engine according to the command, and the direct memory access engine transmits the data to the at least one physical engine for processing.

9. The computing apparatus of claim 8, wherein the at least one physical engine writes a computing result of the data to the first memory through the direct memory access engine, and the data storage control circuit reads the computing result of the data from the first memory and writes the computing result of the data to the storage device.

10. The computing apparatus of claim 1, wherein the bitstream programs the programmable logic circuit to further implement:
a data storage control circuit, arranged to control data access of the first memory and a storage device, and receive a command from a network;
the data storage control circuit reads a data from the storage device according to the command, and the data is transmitted to the at least one physical engine for processing through the direct memory access engine.

11. The computing apparatus of claim 10, wherein the data storage control circuit directly transmits the data to the direct memory access engine, and then the direct memory access engine transmits the data to the at least one physical engine.

12. The computing apparatus of claim 10, wherein the data storage control circuit writes the data to the first memory first, and then the direct memory access engine reads the data from the first memory and transmits the data to the at least one physical engine.

13. The computing apparatus of claim 10, wherein the at least one physical engine writes a computing result of the data to the first memory through the direct memory access engine, and the data storage control circuit reads the computing result of the data from the first memory and returns the computing result of the data through the network.

14. The computing apparatus of claim 1, wherein the bitstream programs the programmable logic circuit to further implement:
a data storage control circuit, arranged to control data access of a storage device;
the data storage control device receives a data to be written to the storage device through a network, and the second processing circuit downloads the application program and the bitstream through the network.

15. The computing apparatus of claim 14, wherein the second processing circuit further executes the application program as a worker node of distributed computing architecture.

16. The computing apparatus of claim 14, wherein the data storage control circuit comprises a first network interface arranged to receive a data to be written to the storage device from a first host through the network; and the second processing circuit comprises a second network interface arranged to download the application program and the bitstream from a second host through the network.

17. The computing apparatus of claim 14, wherein the data storage control circuit comprises a first network interface arranged to receive a data to be written to the storage device from a host through the network; and the second processing circuit comprises a second network interface arranged to download the application program and the bitstream from the host through the network.

18. The computing apparatus of claim 14, wherein the data storage control circuit comprises:
a network interface, arranged to receive a data to be written to the storage device from a first host and download the application program and the bitstream from a second host through the network, where the network interface comprises a data frame splitter circuit arranged to forward the application program and the bitstream downloaded from the second host to the second processing circuit.

19. The computing apparatus of claim 14, wherein the data storage control circuit comprises:
a network interface, arranged to receive a data to be written to the storage device from a host and download the application program and the bitstream from the host through the network, where the network interface comprises a data frame splitter circuit arranged to forward the application program and the bitstream downloaded from the host to the second processing circuit.

* * * * *